United States Patent
Hollingsworth et al.

(10) Patent No.: US 6,387,141 B1
(45) Date of Patent: May 14, 2002

(54) DEPTH AIR FILTER HAVING FIBERS INTERTWINED BY LIQUID-JETTING

(75) Inventors: Anthony Hollingsworth, Birkenau; Oliver Staudenmayer, Weinheim; Ralph Berkemann, Mörlenbach, all of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/400,216

(22) Filed: Sep. 21, 1999

(30) Foreign Application Priority Data

Sep. 21, 1998 (DE) .......................................... 198 43 000

(51) Int. Cl.⁷ ............................................... B01D 39/16
(52) U.S. Cl. ............................ 55/486; 55/487; 55/521; 55/524; 55/528; 55/DIG. 5
(58) Field of Search .................... 55/486, 487, 527, 55/528, 521, DIG. 5, DIG. 44, 524, 512

(56) References Cited

U.S. PATENT DOCUMENTS 4,536,439 A * 8/1985 Forsten .......................... 55/528
4,612,237 A * 9/1986 Frankenburg ................. 55/528
4,883,709 A 11/1989 Nozaki et al.
5,290,628 A * 3/1994 Lim et al. ..................... 428/299
6,146,436 A * 11/2000 Hollingsworth et al. ....... 55/486

FOREIGN PATENT DOCUMENTS

| DE | 41 25 250 | 2/1993 |
| EP | 0 348 993 | 1/1990 |
| EP | 0 534 863 | 3/1993 |

\* cited by examiner

*Primary Examiner*—Robert A. Hopkins
(74) *Attorney, Agent, or Firm*—Kenyon & Kenyon

(57) ABSTRACT

An air filter having a depth filter material which includes a nonwoven fabric having a upstream side and a downstream side. The nonwoven fabric is formed of adhesively and/or cohesively bonded fibers, the fibers having intertwinements which are produced by liquid-jetting from the downstream side prior to the adhesive and/or cohesive bonding, and the fibers, because of the liquid-jetting, being compacted increasingly from the upstream side toward the downstream side in such a way that differently compacted regions are formed, in which particles of different size can be separated.

20 Claims, 4 Drawing Sheets

DEPTH AIR FILTER HAVING FIBERS INTERTWINED BY LIQUID-JETTING

FIELD OF THE INVENTION

The invention relates to an air filter having a depth filter material which contains a nonwoven fabric having a upstream side and a downstream side, the nonwoven fabric being formed of adhesively and/or cohesively bonded fibers.

BACKGROUND OF THE INVENTION

An air filter of this kind is described in the German Patent 44 27 817 C1.

In filters made of a depth filter material, the particles to be separated are separated predominantly in the filter material. In contrast to this stand surface filters in which the particles are accumulated predominantly at the surface of the filter material as a filter cake.

The German Patent 41 25 250 A1 describes an air filter material which is composed of a laminate made of two layers of nonwoven fabric. The layer facing the downstream side is consolidated by water-jetting, and has fibers of an average fineness below 2.2 dtex. Compared to this, the nonwoven fabric layer facing the upstream side has coarser fibers. Both layers are interconnected by mechanical needling. Such a filter medium has indeed an improved efficacy compared to a purely mechanically needled nonwoven fabric. It is a disadvantage, however, that in laminating by needling, needle holes form also in the layer on downstream side which have a negative effect on the filter efficiency with regard to small particles.

Nonwoven fabrics have proven their worth as filter material for air filters and guarantee excellent filtration properties. However, the known filter materials do not fulfill all wishes with regard to the stability and stiffness of the filter material. On one hand, this is significant in the manufacture of air filters to produce a pleated or folded filter having a correspondingly large filter surface. The stiffness, however, is also of great importance for the function of the filter to prevent an excessive deformation of the filter material during operation. A deformation would cause the filter material to rest against the inside wall of the filter housing, which would result in a very high pressure difference and a short service life of the air filter.

SUMMARY OF THE INVENTION

The object of the present invention is to provide an air filter having a particularly stiff filter material.

In the case of an air filter of the type noted above, this objective is achieved in that the fibers have intertwinements which are produced by liquid-jetting from the downstream side prior to the adhesive and/or cohesive bonding. Also, because of the liquid-jetting, the fibers are compacted increasingly from the upstream side toward the downstream side in such a way that differently compacted regions are formed, in which particles of different size can be separated.

The liquid-jetting can particularly be a high-pressure water-jet treatment which is known from the manufacture of nonwoven fabrics. Due to the sharply concentrated high-pressure water jets, which penetrate the nonwoven fabric and strike a base that is permeable to liquids, the fibers are swirled. Because of this, the fibers seized by the liquid jets assume a loop-shaped arrangement. In this context, according to the present invention, the jet energy, which is determined by the liquid mass per unit of time and the liquid pressure, is rated in such a way that the fibers are compacted increasingly from the upstream side toward the downstream side. In this manner, compacted regions are formed, in which particles of different size can be separated.

The liquid-jet treatment from the downstream side carried out in conjunction with the adhesive and/or cohesive fiber bonding results in a nonwoven fabric which has a surprisingly high stiffness and excellent filter properties at the same time. This is surprising because the high-pressure liquid-jetting is used in the manufacture of nonwoven fabrics to produce nonwoven fabrics having a soft, textile handle. A further advantage is that the thicknesses of the filter material of 5 mm and less achieved by the liquid-jet treatment are suitable for an air filter, and can eliminate the need for an additional calendering operation. Moreover, the production cost can be reduced since differently compacted regions can be produced in only one process step also in the case of a single-layer nonwoven fabric.

Advantageously, provision is made for the fibers to have intertwinements which are produced by liquid-jetting from the downstream side prior to the adhesive and/or cohesive bonding. By the additional liquid-jetting from the upstream side, which is preferably carried out using a different jet energy than the liquid-jetting from the downstream side, a particularly firm depth filter material can be obtained.

According to an advantageous embodiment, provision is made for the fibers to have a titer from 0.05 to 50 dtex.

A further improvement of the filter properties is achieved in that the fibers include coarse fibers and fine fibers, the titer of the coarse fibers exceeding the titer of the fine fibers at least by the factor 6. Thus, the air filter can have, for example, fine fibers having a titer of approximately 1 dtex and coarse fibers having a titer of approximately 6 dtex or more.

Particularly small particles can then be separated in the air filter if the fine fibers are at least partially composed of split fibers. Split fibers are relatively coarse multicomponent fibers in usual fiber titers which are capable of being combed, and are easy to process. By cleaving (i.e. splitting) the split fibers, comparatively fine fibers are formed. In this manner, conventional methods can be used to produce also textile fabrics having microfiber structures.

The manufacture of the air filter is particularly simplified by splitting the split fibers using the liquid-jet treatment.

Particularly good dust-storing capacity in the filter material is achieved in that the medium density of the nonwoven fabric increases progressively in the flow direction. Consequently, the filter has a lower fiber density and big filter pores at the upstream side. In this region, the bigger particles to be separated are collected. Toward the downstream side of the air filter, the fiber density increases progressively, the pores formed by the fibers being correspondingly smaller there. Smaller particles to be separated initially pass through the region having a lower fiber density situated on the upstream side, and are then separated in a region having a higher fiber density. In this manner, the air filter can be charged with the particles to be separated over the whole thickness of the filter material. Therefore, long filter endurances and a consistently low pressure loss over the whole filter service life can be achieved.

According to a refinement of the present invention, it is provided for the nonwoven fabric to have at least a first fiber layer facing the upstream side and a second fiber layer facing the downstream side.

The manufacture is particularly simplified in that at least one of the fiber layers is essentially made up of a precompacted nonwoven fabric layer and that at least one other of the fiber layers is substantially formed by a fiber web applied to the nonwoven fabric layer, the fiber web and the nonwoven fabric layer being interconnected by the liquid-jetting.

Particularly good filter properties are achieved by arranging the fiber layer formed by the fiber web at the downstream side of the nonwoven fabric layer.

Particularly small particles can be separated in the filter if the fiber layer formed by the fiber web contains the split fiber.

In a refinement of the present invention provision is made for the fiber layer facing the upstream side to contain a higher proportion of coarse fibers than the fiber layer facing the downstream side. Due to the higher content of coarse fibers in the fiber layer facing the upstream side, bigger pores are formed there. In this context, it can also be provided that the coarse fibers are contained exclusively in the fiber layer facing the upstream side.

A further improvement of the filter properties is achieved by electrostatically charging the fibers. This can be carried out, in particular, by an electret treatment such as a corona treatment.

The cohesive bonding of the fibers can be carried out in a particularly advantageous manner by fusing a part of the fibers together.

The adhesive bonding of the fibers can be carried out in a particularly simple manner by glueing the fibers together using a binding agent. Preferably used are bicomponent binding fibers.

Particularly the production cost of the air filter is reduced by liquid-jetting the filter material over its whole cross-section.

A particularly large filter surface is achieved by pleating the filter material.

BRIEF DESCRIPTION OF THE DRAWINGS

In the following, the subject matter of the present invention is further explained on the basis of the drawings.

DETAILED DESCRIPTION OF THE INVENTION

Figure 1:
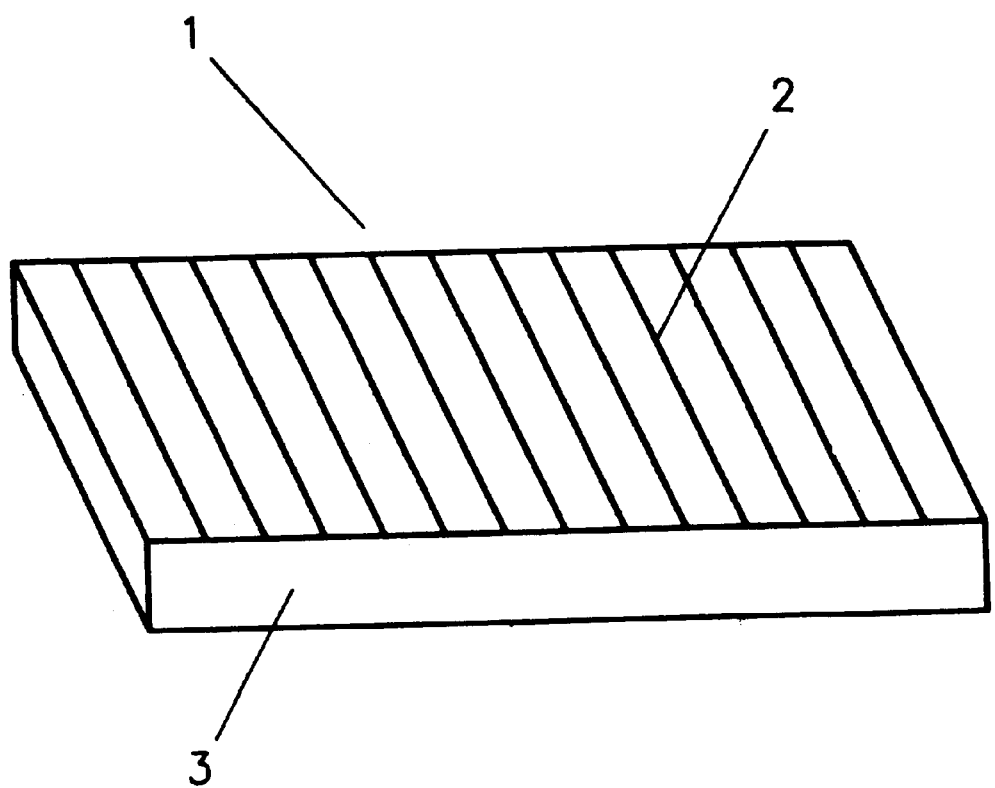
FIG. 1 shows an air filter according to the present invention.

FIG. 1 shows an air filter 1 according to the present invention 1, which is designed as filter cartridge. The air filter has a filter material 2 which is pleated parallel to a lateral edge. Filter material 2 is bordered all around by a sealing strip 3.

Figure 2:
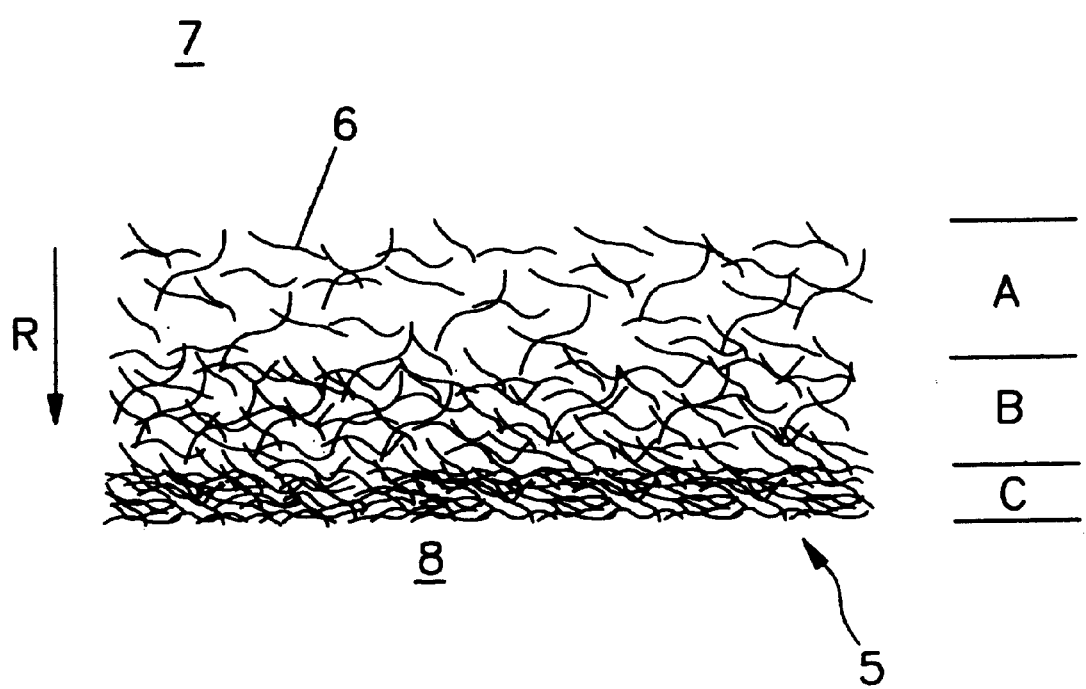
FIG. 2 shows a schematic representation of a cross-section through the filter material according to a first exemplary embodiment.

Filter material 2 is composed of nonwoven fabric 5 further illustrated in FIG. 2. This nonwoven fabric is formed of synthetic fibers 6 having a titer from 0.05 to 50 dtex, and can be manufactured with the assistance of carding machines (e.g. roller cards).

Due to a high-pressure water-jet treatment, intertwinements of fibers 6 are produced in nonwoven fabric 5.

Viewed in flow direction R, nonwoven fabric 5 has regions A, B, C having different properties, which enable particles of different size to be separated in different regions A, B, C. In the embodiment shown in FIG. 2, the different properties of regions A, B, C vary in that the fiber density increases progressively in flow direction R from upstream side 7 to downstream side 8. The increase in fiber density is achieved by subjecting nonwoven fabric 5 to a water-jet treatment from downstream side 8. Due to such a water-jet treatment, fibers 6 of nonwoven fabric 5 are compacted to a greater degree on downstream side 8 than on upstream or afflux inflow side 7 facing away from the water jet. Consequently, the fiber density is lower in region A facing the upstream side 7 than in the middle region B, and is there, in turn, lower than in area C facing downstream side 8. Correspondingly, the size of the interstices or pores of nonwoven fabric 5 which are bordered by fibers 6 increases from region C toward region A. Consequently, during operation, it is possible to separate bigger particles in region A of the air filter, smaller particles in region B, and the finest particles in region C.

After the liquid-jet treatment, fibers 6 of nonwoven fabric 5 are adhesively and/or cohesively bonded. A cohesive bonding can be carried out by fusing, fibers 6 temporarily softening at an elevated temperature, with neighboring fibers 6 bonding together, possibly under pressure, at their points of contact. An adhesive bonding can be carried out by glueing fibers 6 together using a binding agent. This binding agent can be admixed in the form of so-called binding fibers already prior to the production of nonwoven fabric 5. The bonding is then carried out, for example, by a thermal treatment, the sheath of the binding fiber softening and locally interconnecting neighboring fibers 6. An adhesive bonding can also be carried out by applying a liquid polymer binding agent which is cured by a subsequent heat treatment.

Figure 3:
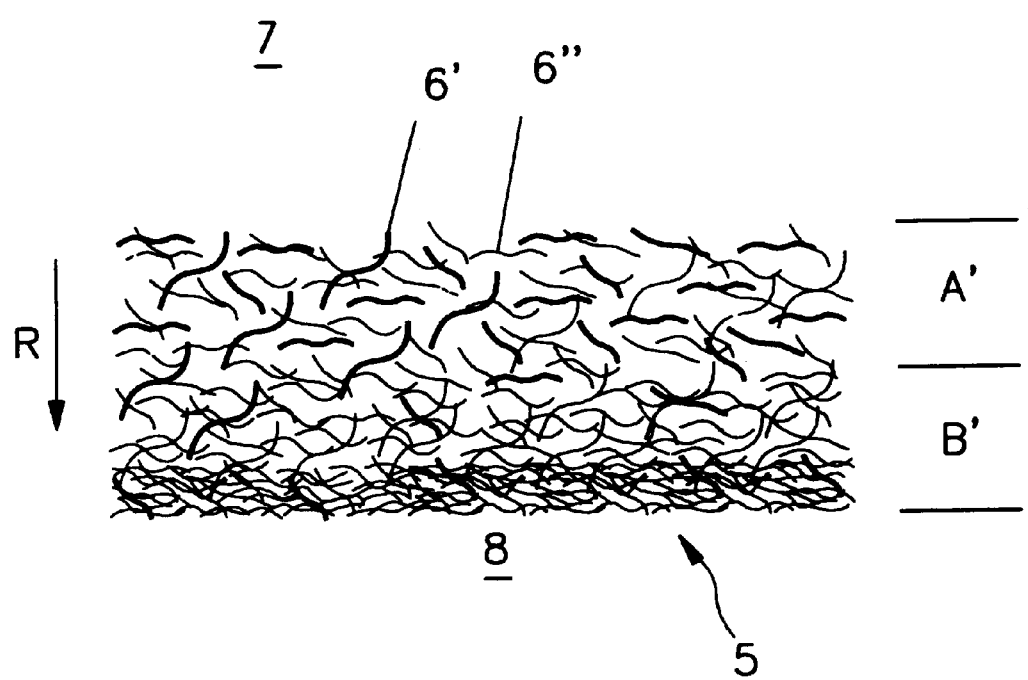
FIG. 3 shows a schematic representation of a cross-section through the filter material according to a second exemplary embodiment.

FIG. 3 shows a further embodiment of nonwoven fabric 5 constructed according to the principles of the invention. Fibers 6 include coarse fibers 6' and fine fibers 6", the titer of the coarse fibers exceeding the titer of the fine fibers by the factor 6. Regions A', B' of nonwoven fabric 5 having different properties in flow direction R are obtained by providing at least two fiber layers having different fiber compositions. The fiber layer facing upstream side 7, which is arranged in region A', contains a higher proportion of coarse fibers 6' than the fiber layer facing downstream side 8, which is arranged in region B'. In this context, weight ratio of the fine fibers to the coarse fibers in nonwoven fabric 5 is from 5 to 95 up to 40 to 60. By the liquid-jetting, intertwinements of fibers 6', 6" are produced, the intertwinements connecting the fiber layers.

To improve the separation of particles, the fibers can be electrostatically charged. This can be done by an electret treatment, in particular, by a corona treatment.

Figure 4:
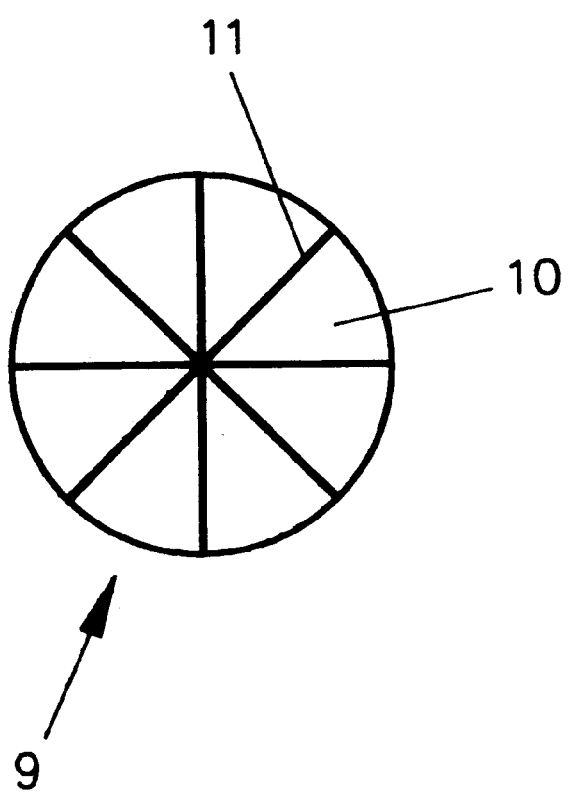
FIG. 4 shows a cross-section through a split fiber.

Fine fibers 6" can at least partially be composed of split fibers 9. A schematic cross-section through such a split fiber 9 is shown in FIG. 4. Shown split fiber 9 has a first component 10 formed of a first polymer and a second component 11 formed of a second polymer. In the exemplary embodiment shown in FIG. 4, eight segments are formed using component 10, component 11 being arranged in the form of layers between the segments, respectively. When split fiber 9 is split or cleft, the eight components 10 each form one of fibers 6 or 6", respectively, which are shown in FIGS. 2 and 3. The titer of fine fibers 6" produced by cleaving split fiber 9 can be down to 0.05 dtex. Unsplit split fiber 9, however, is markedly coarser, and can therefore be processed easily by admixing it to nonwoven fabric 5. The cleaving of split fiber 9 ensues from the pressure exerted on split fiber 9 with the assistance of the water-jet treatment.

The advantages of the air filter according to the present invention and its manufacturing process are explained in the following on the basis of two examples.

EXAMPLE 1

The nonwoven fabric in example 1 has a substance weight of 300 g/m$^2$ and a thickness (measured in accordance with DIN 53855) of 3 mm. The nonwoven fabric is manufactured from combed staple fiber. The fiber composition is 40% of 0.9 dtex, 10% of 6.7 dtex polyester fiber, and 50% of 2.2 dtex polyester bicomponent fiber. Intertwinements of the fibers are produced by one-sided water-jetting using a water pressure between 50 and 100 bar. Then, in a thermofusing oven, the nonwoven fabric is dried and bonded by activating the binding fiber.

This nonwoven fabric has a stiffness in the longitudinal direction of 120 N·m$^2$ (measured at a bending angle of 20° accordance with DIN 53350). This is about 3 times as high as in the case of a nonwoven fabric having identical fiber composition, weight and thickness, but which, however, was produced without liquid-jet treatment.

EXAMPLE 2

The nonwoven fabric in example 2 has a substance weight of 170 g/m$^2$ and a thickness (measured in accordance with DIN 53855) of 0.9 mm. This nonwoven fabric is manufactured from two fiber webs made of combed staple fiber. The fiber composition of the first fiber web, which constitutes 17% of the total weight, contains 50% of a polyolefin split fiber having 2.2 dtex (unsplit) and 50% of a plypropylene fiber having 6.7 dtex.

The fiber composition of the second fiber web contains 100% of a 36 dtex polyolefin bicomponent fiber. A connection of the fiber webs by intertwining the fibers contained therein is produced by water-jetting using a water pressure between 50 and 150 bar, the fibers being dried in a thermofusing oven immediately thereafter and bonded by activating the binding fiber. The nonwoven fabric structure resulting from this exhibits a continuous decrease of fine fibers from the fine-fiber side toward the coarse-fiber side.

The nonwoven fabric structure has a flexural stiffness in the manufacturing direction of 38.0 N·mm$^2$ (measured at a bending angle of 20° accordance with DIN 53350). This is about 3 times as high as in the case of a comparison filter material which is composed of three layers produced in different operations, the layers being produced in the calendering method without liquid-jetting, given identical weight and identical thickness.

A subsequent electrostatical charging of the nonwoven fabric structure results in a filter performance which exceeds that of a three-layer, also electrostatically treated comparison filter medium by 78% in terms of permeability to air (in accordance with DIN 53887), given identical fine separation (in accordance with EN 143) and identical dust-storing capacity.

What is claimed is:

1. An air filter having a depth filter material comprising:
   a nonwoven fabric having a upstream side and a downstream side, the nonwoven fabric being formed of adhesively and/or cohesively bonded fibers; wherein said fibers are comprised of first-thickness-type fibers and second-thickness-type fibers, said first-thickness-type fibers having greater thickness than said second-thickness-type fibers, and said first-thickness-type and second-thickness-type fibers have intertwinements which are produced by liquid-jetting from the downstream side prior to the adhesive and/or cohesive bonding, and wherein the liquid-jetting results in the fibers being compacted increasingly from the upstream side toward the downstream side in such a way that differently compacted regions are formed, in which particles of different size can be separated, each of the differently compacted regions having said first-thickness-type fibers and said second-thickness-type fibers.

2. The air filter as recited in claim 1, wherein the nonwoven fabric is comprised of fibers intertwined by further liquid-jetting from the upstream side prior to the adhesive and/or cohesive bonding.

3. The air filter as recited in claim 1, wherein the fibers have a titer from 0.05 to 50 dtex.

4. The air filter as recited in claim 2, wherein the fibers have a titer from 0.05 to 50 dtex.

5. The air filter as recited in claim 1, wherein the titer of the first-thickness-type fibers exceeds the titer of the second-thickness-type fibers at least by the factor 6.

6. The air filter as recited in claim 1, wherein the second-thickness-type fibers are at least partially composed of split fibers.

7. The air filter as recited in claim 6, wherein the split fibers are split using the liquid-jet treatment.

8. The air filter as recited in claim 1, wherein the median density of the nonwoven fabric increases progressively from the upstream side to the downstream side.

9. The air filter as recited in claim 1, wherein the nonwoven fabric has at least a first fiber layer facing the upstream side and a second fiber layer facing the downstream side.

10. The air filter as recited in claim 9, wherein at least one of the fiber layers is primarily made up of a precompacted nonwoven fabric layer and that at least one other of the fiber layers is primarily formed by a fiber web applied to the nonwoven fabric layer, the fiber web and the nonwoven fabric layer being interconnected by the liquid-jetting.

11. The air filter as recited in claim 10, wherein the fiber layer formed by the fiber web is arranged at the downstream side of the nonwoven fabric layer.

12. The air filter as recited in claim 9, wherein the first fiber layer facing the upstream side contains a higher proportion of first-thickness-type fibers than the second fiber layer facing the downstream side.

13. The air filter as recited in claim 1, wherein the fibers are electrostatically charged.

14. The air filter as recited in claim 1, wherein the nonwoven fabric is comprised of fibers that are fused together.

15. The air filter as recited in claim 1, wherein the nonwoven fabric is comprised of fibers that are glued together by a binding agent.

16. The air filter as recited in claim 1, wherein the nonwoven fabric is of fibers that are compacted increasingly from the upstream side toward the downstream side over a complete cross section of the air filter.

17. The air filter as recited in claim 1, wherein the depth filter material is pleated.

18. An air filter having a depth filter material comprising:
   a nonwoven fabric having a upstream side and a downstream side, the nonwoven fabric being formed adhesively and/or cohesively bonded fibers; wherein the fibers have intertwinements which are produced by liquid-jetting from the downstream side prior to the adhesive and/or cohesive bonding, and wherein the liquid-jetting results in the fibers being compacted increasingly from the upstream side toward the downstream side in such a way that differently compacted regions are formed, in which particles of different size can be separated;

said nonwoven fabric having at least a first fiber layer facing the upstream side and a second fiber layer facing the downstream side; wherein at least one of the fiber layers is primarily made up of a precompacted nonwoven fabric layer and at least one other of the fiber layers is primarily formed by a fiber web that is at least partially composed of split fibers;

wherein said fiber web is applied to the nonwoven fabric layer; the fiber web and the nonwoven fabric layer being interconnected by the liquid jetting.

19. The air filter as recited in claim 18, wherein the fiber layer formed by the fiber web is arranged at the downstream side of the nonwoven fabric layer.

20. An air filter having a depth filter material comprising:

a nonwoven fabric having a upstream side and a downstream side, the nonwoven fabric being formed adhesively and/or cohesively bonded fibers; wherein the fibers have intertwinements which are produced by liquid-jetting from the downstream side prior to the adhesive and/or cohesive bonding, and wherein the nonwoven fabric includes at least first-thickness-type fibers and second-thickness-type fibers, the first-thickness-type-fibers having greater thickness than the second-thickness-type fibers, and wherein the liquid-jetting results in the fibers being compacted increasingly from the upstream side toward the downstream side in such a way that differently compacted regions are formed, in which particles of different size can be separated, and the median density of said nonwoven fabric increases progressively in the flow direction from the upstream side to the downstream side;

said nonwoven fabric having at least a first fiber layer facing the upstream side and a second fiber layer facing the downstream side, wherein the first fiber layer contains a higher proportion of first-thickness-type fibers than the second fiber layer.

* * * * *

UNITED STATES PATENT AND TRADEMARK OFFICE
CERTIFICATE OF CORRECTION

PATENT NO.    : 6,387,141 B1 Page 1 of 1
DATED         : May 14, 2002
INVENTOR(S)   : Hollingsworth et al.

It is certified that error appears in the above-identified patent and that said Letters Patent is hereby corrected as shown below:

Column 6,
Line 56, change "is" to -- is comprised --.

Signed and Sealed this

Eighth Day of April, 2003

JAMES E. ROGAN
*Director of the United States Patent and Trademark Office*